United States Patent
Imaizumi et al.

(10) Patent No.: US 9,400,027 B2
(45) Date of Patent: Jul. 26, 2016

(54) CONED DISC SPRING

(71) Applicant: NHK Spring Co., Ltd., Yokohama-shi, Kanagawa (JP)

(72) Inventors: Hironobu Imaizumi, Kanagawa (JP); Norihiro Tajima, Kanagawa (JP)

(73) Assignee: NHK SPRING CO., LTD., Yokohama (JP)

( * ) Notice: Subject to any disclaimer, the term of this patent is extended or adjusted under 35 U.S.C. 154(b) by 0 days.

(21) Appl. No.: 14/387,372

(22) PCT Filed: Mar. 25, 2013

(86) PCT No.: PCT/JP2013/058570
§ 371 (c)(1),
(2) Date: Sep. 23, 2014

(87) PCT Pub. No.: WO2013/141401
PCT Pub. Date: Sep. 26, 2013

(65) Prior Publication Data
US 2015/0076756 A1 Mar. 19, 2015

(30) Foreign Application Priority Data

Mar. 23, 2012 (JP) .................................. 2012-066878

(51) Int. Cl.
| F16F 1/32 | (2006.01) |
| F16F 1/08 | (2006.01) |
| F16F 1/34 | (2006.01) |
| F16F 1/02 | (2006.01) |

(52) U.S. Cl.
CPC . *F16F 1/32* (2013.01); *F16F 1/025* (2013.01); *F16F 1/027* (2013.01); *F16F 1/08* (2013.01); *F16F 1/34* (2013.01)

(58) Field of Classification Search
CPC ............ F16F 1/08; F16F 1/025; F16F 1/027; F16F 1/32; F16F 1/34
See application file for complete search history.

(56) References Cited

U.S. PATENT DOCUMENTS

| 6,050,557 A * | 4/2000 | Shimoseki ................. F16F 1/32 267/162 |
| 2004/0144614 A1 | 7/2004 | Ookita et al. |
| 2011/0006467 A1* | 1/2011 | Mizuno et al. ................. 267/161 |

(Continued)

FOREIGN PATENT DOCUMENTS

| JP | A-64-035133 | 2/1989 |
| JP | Y2-4-38127 | 9/1992 |

(Continued)

OTHER PUBLICATIONS

International Search Report issued in International Application No. PCT/JP2013/058570 dated May 14, 2013.

*Primary Examiner* — Vishal Sahni
(74) *Attorney, Agent, or Firm* — Oliff PLC (57) ABSTRACT

An elliptical coned disc spring can be accommodated in a rectangular installation space, can yield non-linear load characteristics, and can reduce stress differences between a bending part at a long radial part side and a bending part at a short radial part side. An elliptical coned disc spring has a body in which an outer circumference is an ellipse in a disc shape. A hole is formed at the center of the body. The hole may have various shapes such as a circle, an ellipse, etc. The body has a long radial part 111 and a short radial part. A plate width of the long radial part is set to be greater than a plate width of the short radial part (that is, a>b).

2 Claims, 5 Drawing Sheets

(56) References Cited

U.S. PATENT DOCUMENTS

2011/0057368 A1\* 3/2011 Tajima et al. ................ 267/161
2014/0252705 A1\* 9/2014 Campbell et al. ............ 267/162

FOREIGN PATENT DOCUMENTS

| JP | U-7-25533 | 5/1995 |
| JP | B2-4065178 | 3/2008 |

\* cited by examiner

CONED DISC SPRING

TECHNICAL FIELD

The present invention relates to a coned disc spring that can be used in various applications, such as, as a pressing means, a shock absorbing means, etc. Specifically, the present invention relates to a technique for improving a body shape of the coned disc spring.

BACKGROUND

A coned disc spring has a body in a disc shape (approximately conical shape), and the body has a ring shape with a hole at the center. The coned disc spring can be used in various applications, such as, as a pressing means, a shock absorbing means, etc., in fields such as vehicles, industrial machines, consumer electrical appliances, etc. For example, in a converter (a converter and an inverter) for hybrid automobiles or electric automobiles, the coned disc spring is used as a pressing means for pressing semiconductor elements to a heat sink. In a driving device for vehicles, the coned disc spring is used as a shock absorbing means during a clutch engagement in a clutch mechanism (for example, see the following Patent Document 1).

Patent Document 1 is Japanese Unexamined Utility Application Publication No. 4-38127. Patent Document 2 is Japanese Patent No. 4065178.

Figure 7A:
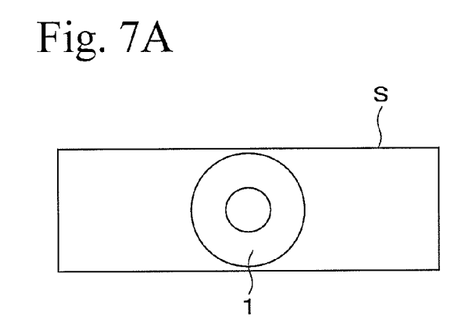
FIGS. 7A and 7B are top views of a conventional coned disc spring that is installed in an installation space.
Figure 7B:
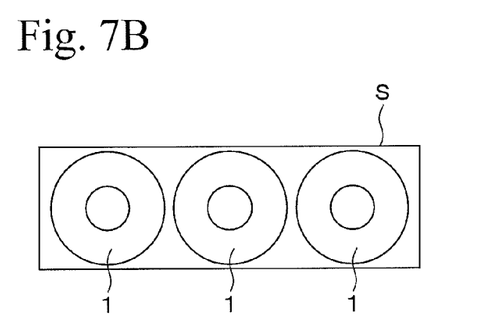

However, when the coned disc spring is used as a pressing means for a semiconductor element, in the converter, in general, plural semiconductor elements are linearly arranged, and therefore, the pressing means is installed in a rectangular installation space. However, in the case in which one coned disc spring 1 is used, for example, as shown in FIG. 7A, it is necessary to correspond the outer diameter of the circular coned disc spring 1 to short sides of the rectangle of the installation space S. In this case, on long sides of the rectangle of the installation space S, dead space, which cannot be pressed by the coned disc spring 1, is formed. As a result, since one coned disc spring 1 must be installed on each semiconductor element, plural coned disc springs 1 are required, for example, as shown in FIG. 7B. Therefore, the number of parts and production cost are increased.

Figure 8A:
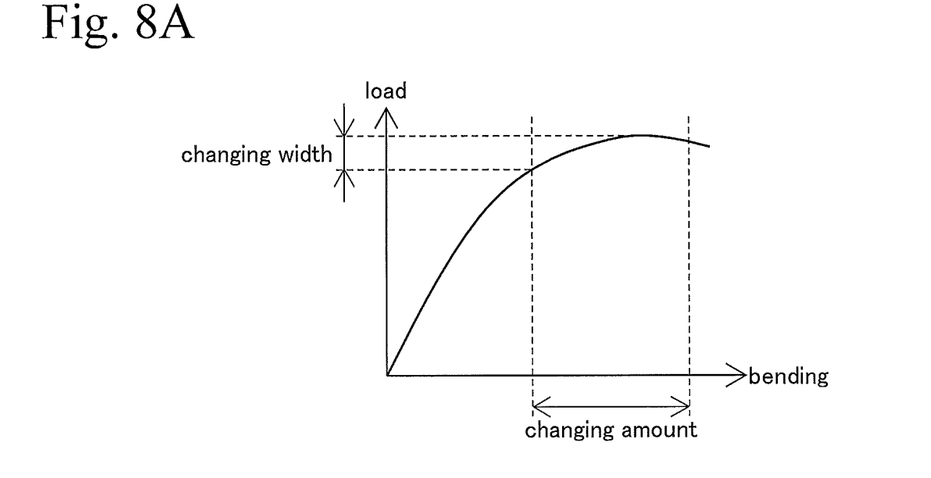
FIG. 8A is a graph showing a load characteristic of the coned disc spring and FIG. 8B is a graph showing a load characteristic of a leaf spring.
Figure 8B:
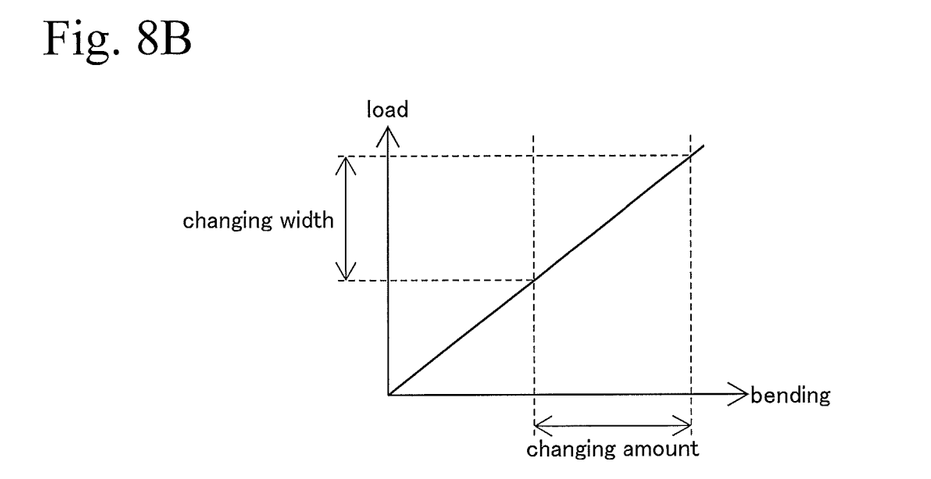

Accordingly, it is considered that a leaf spring having a shape corresponding to the rectangular installation space should be used. However, load characteristics of the leaf spring are different from load characteristics of an elliptical coned disc spring having non-linear characteristics, as shown in FIG. 8A, and has linear characteristics, as shown in FIG. 8B. As a result, the generated load varies greatly, even if the height of each of the semiconductor elements is slightly changed by height dispersion and thermal expansion between the semiconductor elements. Therefore, in order to reduce the number of parts and production cost and obtain the non-linear load characteristics, it is considered that an outer circumference of a coned disc spring should be an ellipse.

On the other hand, in the Patent Documents 1 and 2 in which a coned disc spring is used as a shock absorbing means for a clutch mechanism, it is proposed that the outer circumference of the body have an elliptical shape. For example, in the Patent Document 2, a coned disc spring is used as a shock absorbing means for a clutch mechanism, and in order to improve assembly of the coned disc spring to the clutch mechanism, the body and the hole of the coned disc spring are formed to have an elliptical shape. In this case, all plate widths of the bodies of the coned disc springs are set to be equal. In the clutch mechanism, an annular groove part is provided on a surface facing a friction plate side of a piston, and an inner circumference part of the hole of the coned disc spring is engaged with the annular groove part. However, in the elliptical coned disc spring, stress of a bending part at a long radial part side on the outer circumference is greater than that of a bending part at a short radial part side, and it is necessary to consider the stress of the bending part at the long radial part side in design. As a result, the design is limited. Here, in the present invention, the bending part at the long radial part side is a part at a long radial part side having a small radius of curvature and is a part within a range of a given angle from a long axis of an elliptical outer circumference, and the bending part at the short radial part side is a part at a short radial part side having a radius of greater curvature than that of the bending part at the long radial part side and is a part except for the bending part at the long radial part side on the elliptical outer circumference.

DISCLOSURE OF THE INVENTION

An object of the present invention is to provide an elliptical coned disc spring that can be accommodated in a rectangular installation space, which can yield non-linear load characteristics, and which can reduce stress differences between a bending part at a long radial part side and a bending part at a short radial part side.

The elliptical coned disc spring of the present invention has a hole and a body in a disc shape in which an outer circumference is an ellipse, in which a plate width of a long radial part of the body is set to be greater than a plate width of a short radial part of the body. Here, in the present application, the long radial part and the short radial part are defined as below. Parts having the greatest outer diameter (long diameter) on the elliptical body are long axial parts, and parts having the smallest outer diameter (short diameter) on the elliptical body are short axial parts. The long axial parts and the short axial parts are symmetrically arranged against the center of the ellipse, respectively. The long radial part is a part that is divided at the long axial part at the center of the ellipse, and the short radial part is a part that is divided at the short axial part at the center of the ellipse. A plate width of the long radial part is a half of the difference between an outer diameter (long diameter) and an inner diameter of the long axial part, and a plate width of the short radial part is a half of difference between an outer diameter (short diameter) and an inner diameter of the short axial part.

In the coned disc spring of the present invention, since the body has a disc shape, the same non-linear load characteristics can be obtained as those of conventional coned disc springs in which an outer circumference has a round shape. Furthermore, the outer circumference of the body has an elliptical shape, and the long diameter and the short diameter can be properly set, and therefore, the elliptical coned disc spring of the present invention can be accommodated in a rectangular installation space. In an elliptical coned disc spring in which the body has an elliptical shape, when the plate width of the long radial part and the plate width of the short radial part are set to be equal, generated stress of the bending part at the long radial part side is greater than that of the bending part at the short radial part side having a large radius of curvature. However, in the elliptical coned disc spring t of the present invention, since the plate width of the long radial part is set to be greater than the plate width of the short radial part, the stress difference between the bending part at a long radial part side and the bending part at a short radial part side can be reduced. As a result, the generated stress can be equalized in a circumferential direction of the body. Therefore, the elliptical coned disc spring of the present invention is different from conventional elliptical coned disc springs, and an application range (load) of a stroke can be set to be large without depending on stress of the bending part at the long radial part side having a small radius of curvature.

In the coned disc spring of the present invention, various structures can be applied. For example, an aspect in which an inner diameter of a long axial part is set to be not less than an inner diameter of a short axial part can be used. In this aspect, the stress difference between the bending part at a long radial part side and the bending part at a short radial part side can be effectively reduced, and as a result, the generated stress can be effectively equalized in a circumferential direction of the body.

According to the elliptical coned disc spring of the present invention, effects that can be accommodated in a rectangular installation space, which can yield non-linear load characteristics, which can reduce stress differences between a bending part at a long radial part side and a bending part at a short radial part side, and the like, are obtained.

BRIEF DESCRIPTION OF DRAWINGS

FIG. 1B is a top view of a part of the coned disc spring.

EXPLANATION OF REFERENCE NUMERALS

Reference numeral 100 denotes an elliptical coned disc spring (coned disc spring), 110 denotes a body, 110A denotes a hole, 111 denotes a long radial part, 112 denotes a short radial part, a denotes a plate width of a long radial part, b denotes a plate width of a short radial part, 111A denotes a bending part at a long radial part side, 112A denotes a bending part at a short radial part side, Dai denotes an inner diameter of a long axial part, and Dbi denotes an inner diameter of a short axial part.

Best Mode for Carrying out the Invention

In the following, an embodiment of the present invention will be explained with reference to the figures. FIGS. 1A to 2B are drawings showing structures of an elliptical coned disc spring according to an embodiment of the present invention.

Figure 1A:
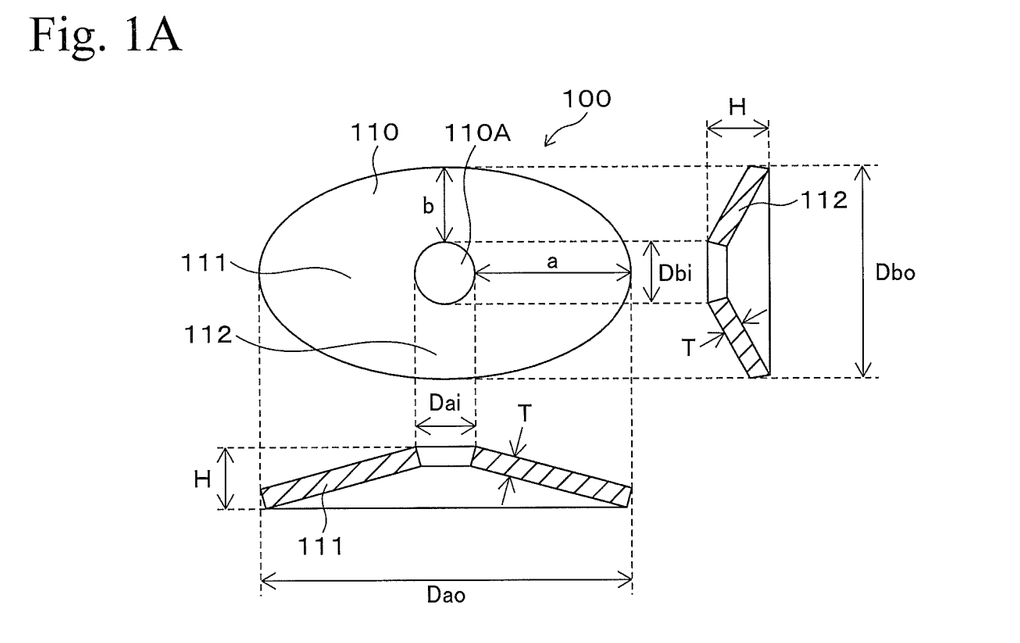
FIGS. 1A and 1B show a structure of a coned disc spring according to an embodiment of the present invention. The center figure in FIG. 1A is a top view of the coned disc spring, the lower figure is a cross sectional view in an axial direction of a long axial part of the coned disc spring, the figure to the right is a cross sectional view in an axial direction of a short radial part of the coned disc spring.
Figure 1B:
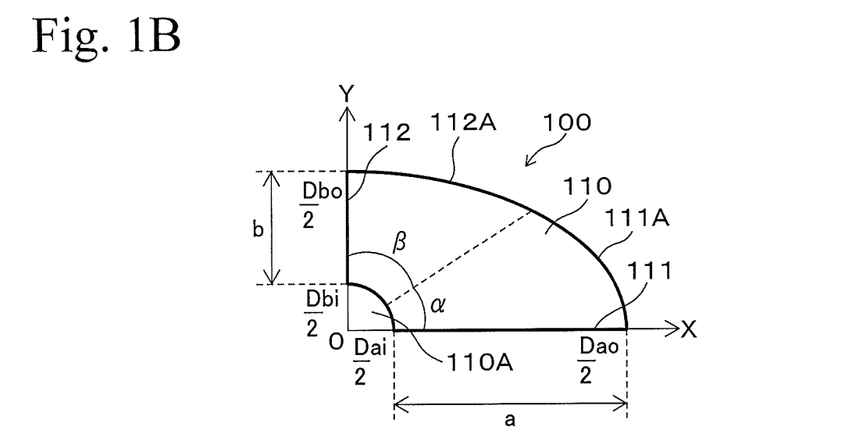

Here, in FIG. 1B, an XY coordinate system is set, the center of an ellipse is set to the origin in the XY coordinate system, a part having a long diameter of the ellipse (long axial part) is set to an X axis direction, and a part having a short diameter of the ellipse (short axial part) is set to a Y axis direction. In FIG. 1B, only quadrant one of the XY coordinate system is shown as a matter of convenience, since the ellipse coned disc spring 100 has a symmetrical shape against each of the X axis and the Y axis.

The elliptical coned disc spring 100 is used in various applications such as a pressure means, a shock absorbing means, etc. The elliptical coned disc spring 100 (coned disc spring) has a disc shape (approximately conical), for example, as shown in FIGS. 1A and 1B, and it has a body 110 in which an outer circumference is an ellipse. A hole 110A is formed at the center of the body 110. The body 110 has a long radial part 111 and a short radial part 112. The long radial part 111 is an X-axis plus direction part and an X-axis negative direction part in which the long axial part is divided at the origin 0 (the center of ellipse) of the coordinate system. The short radial part 112 is a Y-axis plus direction part and a Y-axis negative direction part in which the short axial part is divided at the origin 0 (the center of ellipse) of the coordinate system.

A plate width a of the long radial part 111 is set to be greater than a plate width b of the short radial part 112 (that is, a>b). Specifically, the plate width a of the long radial part 111 is half of the difference between an outer diameter of the long axial part Dao (a long diameter) and an inside diameter Dai of the long axial part (that is, $a = (Dao-Dai)/2$). The plate width b of the short radial part 112 is half of the difference between an outer diameter of the short axial part Dbo (a short diameter) and an inner diameter of the short axial part Dbi (that is, $b = (Dbo-Dbi)/2$). Here, a plate width at a given position of a body is half of the difference between an outer diameter (a length between intersections of a straight line which passes through the center of an ellipse and an outer circumference of the ellipse) and an inner diameter (a length between intersections of a straight line which passes through the center of an ellipse and an inner circumference of the ellipse).

The bending part at a long radial part side 111A, for example, shown in FIG. 1B, is a bending part at a long radial part 111 side, and it is a part within a given angle range from an X-axis on the outer circumference of the body 110 (for example, within a range from 0 to α degrees when an X-axis is set to be a standard). The bending part at a short radial part side 112A, for example, shown in FIG. 1B, is a bending part at a short radial part 112 side, and it is a part except for the bending part at a long radial part side 111A (for example, within a range from 0 to β degrees when a Y-axis is set to be a standard, and α+β=90 degrees).

In the body 110, the plate width a of the long radial part 111 is set to be greater than the plate width b of the short radial part 112, as described above, and for example, the plate width is set to be decreased from the long radial part 111 to the short radial part 112. In the body 110, for example, a height is set to be H, and a plate thickness is set to be T. The height H can be properly changed depending on its application.

The hole 110A may have various shapes. For example, in the elliptical coned disc spring 100 shown in FIG. 1, the hole 110A has a round shape, and it is set that an inner diameter Dai of the long axial part is equal to an inner diameter Dbi of the short axial part (that is, Dai=Dbi).

Figure 2A:
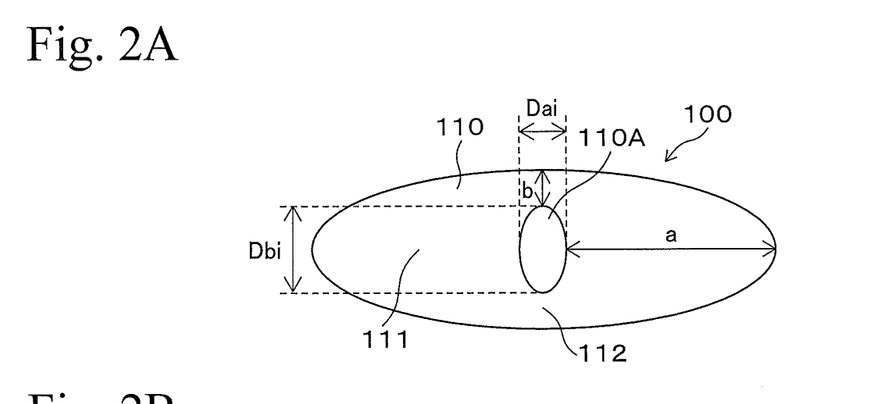
FIGS. 2A and B are top views showing a structure of an alternative example of the coned disc spring according to an embodiment of the present invention.
Figure 2B:
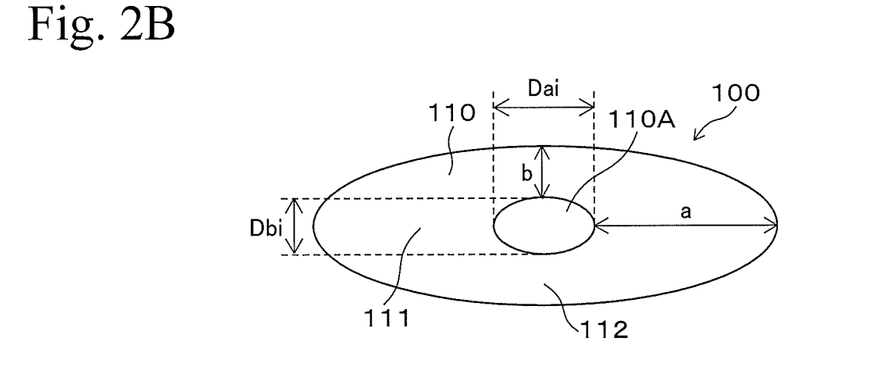

For example, in the elliptical coned disc spring 100 shown in FIGS. 2A and 2B, the hole 110A has an elliptical shape. In the hole 110A shown in FIG. 2A, for example, an inner diameter Dai of the long axial part is set to be less than an inner diameter Dbi of the short axial part (that is, Dai<Dbi). In the hole 110A shown in FIG. 2B, for example, an inner diameter Dai of the long axial part is set to be greater than an inner diameter Dbi of the short axial part (that is, Dai>Dbi).

It is preferable that the inner diameter Dai of the long axial part be set to be not less than the inner diameter Dbi of the short axial part (that is, Dbi). In addition, in the case in which the elliptical coned disc spring 100 is applied to a clutch mechanism, it is preferable that the hole 110A have an elliptical shape when an inner circumference part of the hole 110A is engaged with an annular groove part on a surface facing a piston.

In the following, a production method for the elliptical coned disc spring 100 will be explained. First, for example, a blank in an elliptical shape (an elliptical blank) having a hole at the center is punched out from a plate having a plate thickness T by press working. Next, for example, the elliptical blank is shaped by bend-forming so as to have a disc shape. Then, the elliptical blank in a disc shape is subjected to a heat treatment, as necessary, and thereby, an elliptical coned disc spring 100 in a disc shape in which an outer circumference has an elliptical shape (plate thickness T, height H) is obtained. Here, the bending-forming and the heat treatment to the blank may be simultaneously carried out. Additionally, the production method of the elliptical coned disc spring 100 can be variously changed, and for example, conventional production methods of a coned disc spring can be used within a range of the present invention.

In the present embodiment, since the body 110 has a disc shape, the same non-linear load characteristics can be obtained as those of conventional coned disc springs in which an outer circumference has a round shape. Furthermore, the outer circumference of the body 110 has an elliptical shape, and the long diameter and the short diameter can be properly set, and therefore, the elliptical coned disc spring of the present invention can be accommodated in a rectangular installation space.

Figure 3:
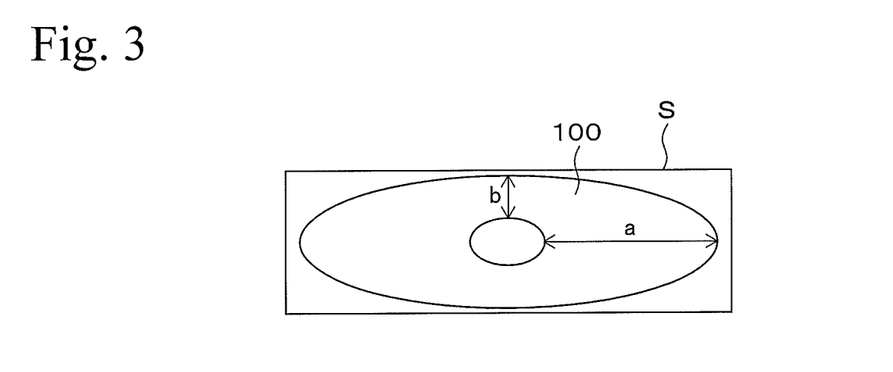
FIG. 3 is a top view of an elliptical coned disc spring according to an embodiment of the present invention that is installed in an installation space.
Figure 4:
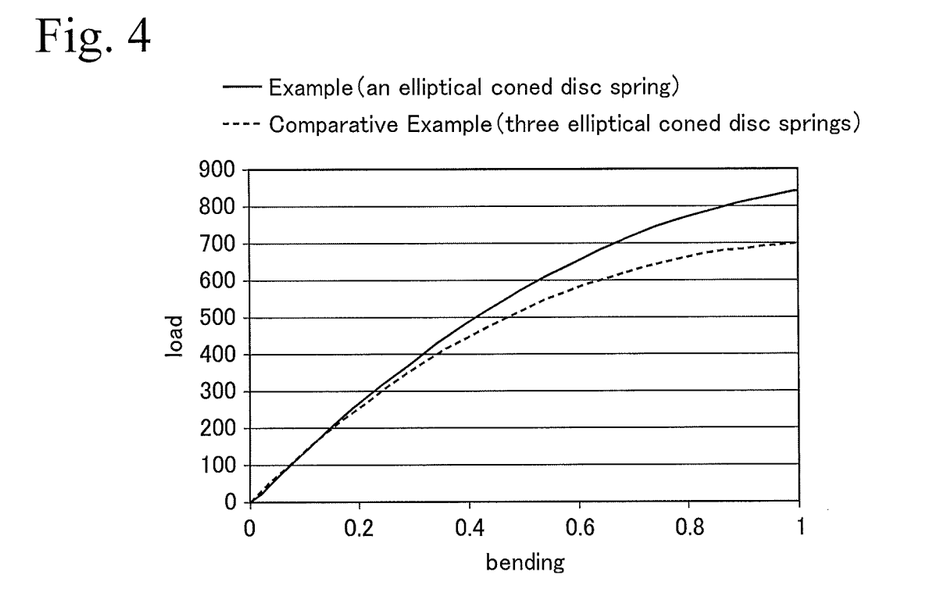
FIG. 4 is a graph showing a load characteristic of the coned disc springs according to an example of the present invention and a comparative example.

This will be explained in detail using an Example. In the Example, as a spring installed on an installation space S, an elliptical coned disc spring 100 of the Example of the present invention shown in FIG. 3 and three disc springs of the Comparative Example shown in FIG. 7B, were used. In the elliptical coned disc spring 100 of the Example, a long diameter was set to be 60 mm, a short diameter was set to be 23.5 mm, and a plate width a of a long radial part was set to be greater than a plate width b of a short radial part. In each coned disc spring 1 of the Comparative Example, an outer diameter was set to be 23.5 mm, and an inner diameter was set to be 16 mm. With respect to the elliptical coned disc spring 100 of the Example and the three coned disc springs 1 of the Comparative Example, the load characteristics were examined, and as a result, the elliptical coned disc spring 100 of the Example were found to have characteristics approximately equal to those of the three coned disc springs 1 of the Comparative Example, as shown in FIG. 4.

Thus, in the elliptical coned disc spring 100 of the Example, the non-linear load characteristics can be obtained, and as a result, when it is used as a pressing means for semiconductor elements, generated load can be prevented from changing, even if the height of each of the semiconductor elements changes by height dispersion and thermal expansion between the semiconductor elements. In this case, an elliptical coned disc spring 100 can be accommodated in the rectangular installation space S, and therefore, the number of parts and the production cost can be decreased.

Moreover, in the elliptical coned disc spring 100, since the plate width a of the long radial part 111 is set to be greater than the plate width b of the short radial part 112, the stress difference between the bending part at a long radial part side 111A and the bending part at a short radial part side 112A is reduced, and as a result, the generated stress can be equalized in a circumferential direction of the body 110.

Figure 5:
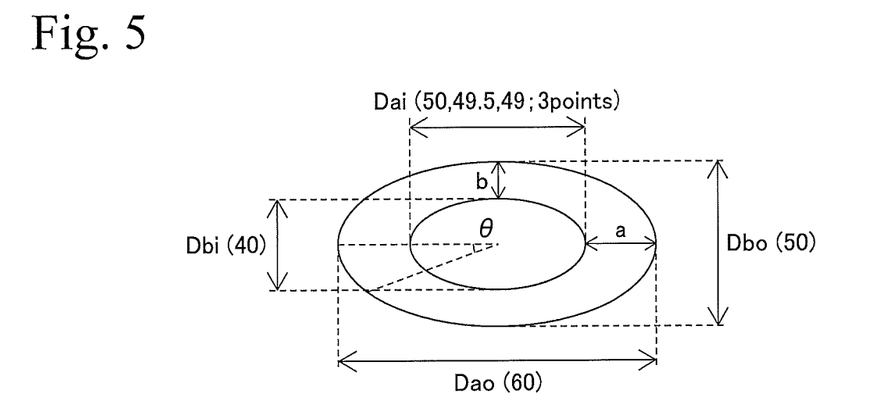
FIG. 5 is a schematic view showing each length in the coned disc springs according to an example of the present invention.

This will be explained in detail using an Example. In the Example, with respect to the elliptical coned disc spring shown in FIG. 5, generated stress at the outer circumference part was examined by fixing an outer diameter Dao of a long axial part (long diameter), an outer diameter of a short axial part Dbo (short diameter) and an inner diameter of a short axial part Dbi, and by changing an inner diameter of a long axial part Dai. In this case, and 21 points of generated stress data at even intervals in which an angle θ was from 0 to 90 degrees, were measured.

With respect to all elliptical coned disc springs of Examples 11 and 12 of the present invention and Comparative Example 11, the outer diameter of the long axial part Dao was set to be 60 mm, the outer diameter of the short axial part Dbo was set to be 50 mm, and the inner diameter of the short axial part Dbi was set to be 40 mm. The plate width of the short radial part b was fixed to be 5 mm. The inner diameter of the long axial part Dai of the elliptical coned disc spring according to Example 11 of the present invention was set to be 49.5 mm (that is, the plate width of the long radial part a was 5.25 mm). The inner diameter of the long axial part Dai of the elliptical coned disc spring according to Example 12 of the present invention was set to be 49 mm (that is, the plate width of the long radial part a was 5.5 mm), and the inner diameter of the long axial part Dai of the elliptical coned disc spring of Comparative Example 11 was set to be 50 mm (that is, the plate width of the long radial part a was 5 mm).

Figure 6:
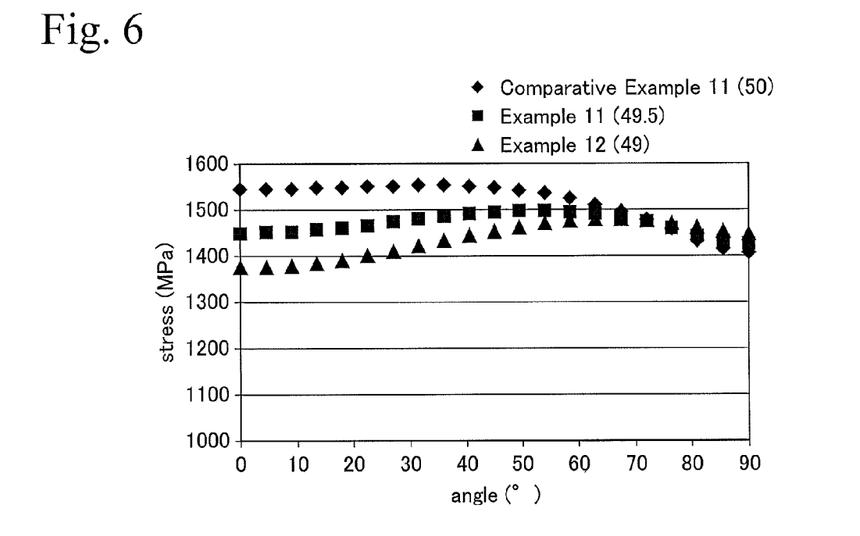
FIG. 6 is a graph showing the relationship between an angle and a generated stress when a long diameter is changed.

FIG. 6 is a graph showing the relationship between an angle θ and a generated stress on the elliptical coned disc springs of Examples 11 and 12 and Comparative Example 11. In FIG. 6, when the angle is 0 degrees, a bending part at a long radial part side is a long axial position, and when the angle is 90 degrees, a bending part at a short radial part side is a short axial position.

In a circular coned disc spring, in general, the generated stress is equalized in a circumferential direction of a body. However, as is apparent from FIG. 6, in Comparative Example 11, for the present invention in which the plate width a of the long radial part and the plate width b of the short radial part are set to be equal, generated stress of the bending part at the long radial part side was greater than that of the bending part at the short radial part side, and the stress difference was large. In contrast, when the plate width a of the long radial part was set to be greater than the plate width b of the short radial part, the generated stress of the bending part at the long radial part side was reduced, and the stress difference was decreased. Therefore, in comparison with the Comparative Example 11, which differs from the present invention, in the Examples 11 and 12 of the present invention, it was confirmed that the stress difference between the bending part at the long radial part side and the bending part at the short radial part side can be decreased.

As described above, in the elliptical coned disc spring 100 according to the embodiment of the present invention, since the stress difference between the bending part at the long radial part side 111A and the bending part at the short radial part side 112A can be reduced, the generated stress can be equalized in a circumferential direction of the body 110. Therefore, the elliptical coned disc spring of the present invention is different from conventional elliptical coned disc springs, and an application range (load) of a stroke can be set to be large without depending on stress of the bending part at the long radial part side 111A having a small radius of curvature.

In particular, for example, by setting the inner diameter of the long axial part Dai to be not less than the inner diameter of the short axial part Dbi, the stress difference between the bending part at the long radial part side 111A and the bending part at the short radial part side 112A can be effectively reduced, and the generated stress can be effectively equalized in a circumferential direction of the body 110.

The invention claimed is:

1. A coned disc spring comprising:

a hole and a body in a disc shape in which an outer circumference is an ellipse, wherein a portion having a maximum outer diameter in the ellipse body is defined as a long radial part and a portion having a minimum outer diameter in the ellipse body is defined as a short radial part, a plate width extending from an inner circumference of the hole to a peripheral portion of the long radial part of the body is set to be greater than a plate width extending from an inner circumference of the hole to a peripheral portion of the short radial part of the body, an inner diameter of the hole along the long radial part is set to be not less than an inner diameter of the hole along the short radial part, and the plate width of the long radial part of the body is defined as "a" and the plate width of the short radial part of the body is defined as "b", a/b is not less than 1.05 and not more than 1.10.

2. A coned disc spring comprising:

a hole and a body in a disc shape in which an outer circumference is an ellipse, wherein a portion having a maximum outer diameter in the ellipse body is defined as a long radial part and a portion having a minimum outer diameter in the ellipse body is defined as a short radial part, a plate width extending from an inner circumference of the hole to a peripheral portion of the long radial part of the body is set to be greater than a plate width extending from an inner circumference of the hole to a peripheral portion of the short radial part of the body, and an inner diameter of the hole along the long radial part is set to be larger than an inner diameter of the hole along the short radial part.

* * * * *